(12) United States Patent
Sato

(10) Patent No.: US 10,473,547 B2
(45) Date of Patent: Nov. 12, 2019

(54) PIEZOELECTRIC PRESSURE SENSOR WITH ACCOMMODATION FOR THERMAL DEFORMATION

(71) Applicant: MIKUNI CORPORATION, Tokyo (JP)

(72) Inventor: Tomoya Sato, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 147 days.

(21) Appl. No.: 15/566,216

(22) PCT Filed: Apr. 11, 2016

(86) PCT No.: PCT/JP2016/061656
§ 371 (c)(1),
(2) Date: Oct. 13, 2017

(87) PCT Pub. No.: WO2016/167208
PCT Pub. Date: Oct. 20, 2016

(65) Prior Publication Data
US 2018/0113045 A1    Apr. 26, 2018

(30) Foreign Application Priority Data
Apr. 16, 2015 (JP) .................................. 2015-083830

(51) Int. Cl.
*G01L 23/10* (2006.01)
*G01L 9/00* (2006.01)
(Continued)

(52) U.S. Cl.
CPC .............. *G01L 23/10* (2013.01); *G01L 9/008* (2013.01); *G01L 9/0044* (2013.01); *G01L 19/0046* (2013.01); *G01L 19/04* (2013.01)

(58) Field of Classification Search
CPC ....... G01L 23/10; G01L 23/22; G01L 23/221; G01L 23/222; G01L 19/04; G01L 7/088; G01L 9/00–18
See application file for complete search history.

(56) References Cited

U.S. PATENT DOCUMENTS 4,625,559 A  * 12/1986  Carter ................... G01L 9/006
                                                        250/231.19
2003/0233883 A1    12/2003  Mei
(Continued)

FOREIGN PATENT DOCUMENTS

JP     H08511099      11/1996
JP     2005326336     11/2005
(Continued)

OTHER PUBLICATIONS

Machine translation of JP-2008286589.*
(Continued)

*Primary Examiner* — Nathaniel J Kolb
(74) *Attorney, Agent, or Firm* — JCIPRNET

(57) ABSTRACT

This pressure sensor is equipped with: a housing (10) having a tip tubular portion (11) that lengthens in the direction of an axis (S) and is exposed to a pressure medium; an output measurement unit (20) that includes a piezoelectric member (22) and is housed inside the housing; and a pressure transmission member for occluding the space for storing the output measurement unit in the housing, and transmitting the pressure from the pressure medium imparted in the axial direction to the output measurement unit. The pressure transmission member is a bottomed diaphragm having: an inner tubular portion (32) that is affixed to the tip portion of the tip tubular portion and lengthens in the axial direction toward the output measurement unit inside the tip tubular portion; and a pressure receiving bottom portion (33) that
(Continued)

contacts the output measurement unit and is integrally formed with the inner tubular portion.

6 Claims, 6 Drawing Sheets

(51) Int. Cl.
*G01L 19/00* (2006.01)
*G01L 19/04* (2006.01)

(56) References Cited

U.S. PATENT DOCUMENTS

| | | | |
|---|---|---|---|
| 2005/0252299 A1* | 11/2005 | Oda | G01L 9/006 73/715 |
| 2012/0216621 A1 | 8/2012 | Oto | |
| 2016/0238485 A1* | 8/2016 | Takemoto | G01M 15/08 |

FOREIGN PATENT DOCUMENTS

| | | | |
|---|---|---|---|
| JP | 2008286589 | 11/2008 | |
| JP | 2008286589 A * | 11/2008 | G01L 23/22 |
| JP | 2012145580 | 8/2012 | |
| WO | WO-9429686 A1 * | 12/1994 | G01L 19/04 |
| WO | WO-9429687 A1 * | 12/1994 | G01L 19/04 |
| WO | 2007043068 | 4/2007 | |

OTHER PUBLICATIONS

"Search Report of Europe Counterpart Application", dated Nov. 16, 2018, p. 1-p. 8.

"International Search Report (Form PCT/ISA/210) of PCT/JP2016/061656", dated Jul. 5, 2016, with English translation thereof, pp. 1-4.

* cited by examiner

PIEZOELECTRIC PRESSURE SENSOR WITH ACCOMMODATION FOR THERMAL DEFORMATION

CROSS-REFERENCE TO RELATED APPLICATION

This application is a 371 application of the International PCT application serial no. PCT/JP2016/061656, filed on Apr. 11, 2016, which claims the priority benefits of Japan Patent Application No. 2015-083830, filed on Apr. 16, 2015. The entirety of each of the above-mentioned patent application is hereby incorporated by reference herein and made a part of this specification.

TECHNICAL FIELD

The present invention relates to a pressure sensor configured to detect a pressure of a pressured medium, and in particular, a pressure sensor configured to detect a pressure of a high temperature pressured medium such as a combustion gas or the like in a combustion chamber of an engine.

BACKGROUND ART

As a pressure sensor in the related art, there is known a pressure sensor including a piezoelectric element (a piezo element) configured to electrically detect a pressure, a housing configured to accommodate the piezoelectric element and having a tip portion exposed in a combustion chamber, and a pressure transmission member configured to block an internal space in which the piezoelectric element is accommodated from a combustion gas in the combustion chamber and transmit the pressure of the combustion gas in the combustion chamber to the piezoelectric element, wherein a diaphragm configured to close a tip portion of the housing and a plunger disposed to come into contact between the diaphragm and the piezoelectric element are employed as the pressure transmission member (for example, see Patent Literature 1).

In the pressure sensor, the diaphragm is formed to integrally include an outer circumferential flange portion fixed to the tip portion of the housing, a conically inclined portion slightly inclined from the outer circumferential flange portion and having an embossed depth of about 50 µm, and a central flat plate portion in contact with the plunger.

In addition, an annular concave portion is provided in the tip portion of the housing such that a predetermined gap is formed between the diaphragm and a tip-side region of the plunger. Then, a thermal shock error is prevented while preventing a warp due to thermal deformation of the diaphragm.

However, since two members that are referred to as the diaphragm and the plunger are employed as the pressure transmission member, three members including the housing, the diaphragm and the plunger are present as members that is thermally deformed. Therefore, there are more causes of an error due to thermal deformation. In addition, since deformation in the axial direction due to the thermal expansion of the diaphragm and deformation in the axial direction due to the thermal expansion of the housing are not oriented so as to cancel each other out, the detection error in the pressure due to the thermal strain cannot be solved. In addition, since the tip portion of the housing exposed in the combustion chamber has different thicknesses and has an annular concave portion, thermal deformation of the tip portion is not simple. Therefore, the error due to thermal deformation may be promoted. Further, since the number of parts is great, and various kinds of processing are necessary, an increase in costs occurs.

In addition, as another pressure sensor, there is known a pressure sensor including a piezoelectric element (a conversion element) configured to electrically detect a pressure, a housing configured to accommodate the piezoelectric element and having opening to a combustion chamber, and a pressure transmission member configured to block an internal space in which the piezoelectric element is accommodated from a combustion gas in the combustion chamber and transmit a pressure of a combustion gas in the combustion chamber to the piezoelectric element, wherein a diaphragm disposed inside the housing and a rod passing through a central portion of the diaphragm to be exposed in the combustion chamber and in contact with the piezoelectric element are employed as the pressure transmission member (for example, see Patent Literature 2).

In this pressure sensor, the diaphragm is formed to integrally include an outer tubular portion connected to an annular groove formed in an inner wall of the housing, an inner tubular portion connected to an annular groove formed in an outer circumference of the rod, and an annular flat plate portion configured to connect the outer tubular portion to the inner tubular portion. Then, an influence due to thermal deformation of the diaphragm is suppressed.

However, as described above, since the two members that are referred to as the diaphragm and the rod are employed as the pressure transmission member, three members including the housing, the diaphragm and the rod are present as members that generate thermal deformation. Therefore, there are more causes of an error due to thermal deformation. In addition, when the rod expands toward the combustion chamber due to heating, the diaphragm also moves or thermally expands toward the combustion chamber together therewith, and the detection error in the pressure due to the thermal strain cannot be solved. Further, since the number of parts is great, and various kinds of processing are necessary, an increase in costs occurs.

CITATION LIST

Patent Literature

Patent Literature 1: Japan Domestic re-publication of PCT publication No. 08-511099
Patent Literature 2: Japanese Patent Application Publication No. 2012-145580

SUMMARY OF INVENTION

Technical Problem

In consideration of the above-mentioned circumstances, an object of the present invention is to provide a pressure sensor capable of suppressing measurement error due to thermal deformation or the like to suppress variation in sensor sensitivity with respect to temperature variation and accurately detecting a pressure of a pressured medium such as a combustion gas or the like in a combustion chamber of an engine while achieving simplification of a structure, reduction in the number of parts, reduction in the number of processing operations, reduction in cost, and so on.

Solution To Problem

A pressure sensor of the present invention includes a housing extending in a predetermined axial direction and having a tip tubular portion exposed to a pressured medium; an output measurement unit including a piezoelectric member accommodated in the housing; and a pressure transmission member configured to close an accommodating space of the output measurement unit in the housing and transmit a pressure of the pressured medium applied in the axial direction to the output measurement unit, wherein the pressure transmission member is a bottomed diaphragm, and the pressure transmission member has an inner tubular portion fixed to a tip portion of the tip tubular portion and extending in the axial direction toward the output measurement unit inside the tip tubular portion, and a pressure receiving bottom portion formed integrally with the inner tubular portion and abutting the output measurement unit.

According to this configuration, in a state in which the tip tubular portion of the housing and the diaphragm are exposed to the pressured medium, when the pressure of the pressured medium in the axial direction is received, the pressure is transmitted to the output measurement unit via the pressure receiving bottom portion of the diaphragm. Then, an electrical signal of a voltage or the like corresponding to the pressure is output from the piezoelectric member of the output measurement unit, and the pressure of the pressured medium is detected.

Here, when the pressure sensor receives heat of a high temperature combustion gas or the like in the combustion chamber of the engine, as the inner tubular portion is provided in the diaphragm. When the tip tubular portion of the housing expands toward the combustion chamber in the axial direction, the inner tubular portion of the diaphragm expands toward the output measurement unit in the axial direction. That is, thermal expansion of the inner tubular portion of the diaphragm is generated in a direction to offset thermal expansion of the tip tubular portion of the housing. In other words, since the inner tubular portion of the diaphragm and the tip tubular portion of the housing thermally expand in opposite directions, a contact state between the pressure receiving bottom portion of the diaphragm and the output measurement unit can be maintained.

Accordingly, variation in preload applied to the output measurement unit can be prevented and output noise from the piezoelectric member due to variation in preload can be prevented. Therefore, it is possible to accurately detect a pressure of a pressured medium such as a combustion gas or the like in the combustion chamber of the engine by suppressing a measurement error due to thermal deformation or the like.

In addition, since only the diaphragm fixed to the tip portion of the tip tubular portion of the housing is employed as the pressure transmission member configured to transmit a pressure of the pressured medium to the output measurement unit, it is possible to accomplish simplification of a structure, reduction in the number of parts, reduction in the number of processing operations, reduction in cost, and so on, while reducing causes of an error due to thermal deformation.

In the above-mentioned configuration, the pressure transmission member may have an annular flange portion fixed to an end surface of the tip tubular portion, and the inner tubular portion may be formed integrally with the annular flange portion.

According to this configuration, the annular flange portion may act exclusively a fixing function to the tip tubular portion, and the inner tubular portion may act only as a deformation function of expanding toward the output measurement unit in the axial direction.

In the above-mentioned configuration, the annular flange portion of the diaphragm may be folded to a folding angle within a range of 90 to 100 degrees with respect to the inner tubular portion.

According to this configuration, since the annular flange portion configured to fix the diaphragm to the end surface of the tip tubular portion of the housing is folded to a folding angle within a range of 90 to 100 degrees with respect to the inner tubular portion, a direction in which the inner tubular portion of the diaphragm thermally expands toward the output measurement unit can match a direction in which the housing thermally expands. Accordingly, deviation of a contact position between the pressure receiving bottom portion of the diaphragm and the output measurement unit can be more accurately managed.

In the above-mentioned configuration, the inner tubular portion may be disposed inside the tip tubular portion with a predetermined gap.

According to this configuration, in a state in which the inner tubular portion of the diaphragm is inserted inside the tip tubular portion of the housing, since the predetermined gap is provided between the inner wall surface of the tip tubular portion and the outer wall surface of the inner tubular portion, when the tip tubular portion of the housing expands toward the combustion chamber in the axial direction, it is possible to prevent the inner tubular portion of the diaphragm from being dragged by movement of the tip tubular portion and moved in the same direction. Therefore, expansion movement of the tip tubular portion toward the combustion chamber can be more reliably offset by expansion movement of the inner tubular portion toward the output measurement unit, and a stable contact position between the pressure receiving bottom portion of the diaphragm and the output measurement unit can be maintained.

In the above-mentioned configuration, the tip tubular portion of the housing and the inner tubular portion of the diaphragm may be formed to have substantially the same thermal deformation amount in the axial direction.

According to this configuration, in consideration of thermal expansion coefficients (a linear expansion coefficient and a volume expansion coefficient) of materials that form the housing and the diaphragm, shapes thereof, and so on, a thermal deformation amount of the tip tubular portion toward the combustion chamber in the axial direction and an opposite thermal deformation amount of the inner tubular portion toward the output measurement unit in the axial direction can be previously set to be substantially equal to each other. Accordingly, thermal expansion of the tip tubular portion of the housing can be more accurately offset by opposite thermal expansion of the inner tubular portion of the diaphragm.

In the above-mentioned configuration, the housing may have a seal portion configured to seal a pressured medium around the tip tubular portion and at a predetermined position retracted from an end surface of the tip tubular portion, and a length of the inner tubular portion of the diaphragm in the axial direction may be substantially the same as a length in the axial direction from the end surface of the tip tubular portion to the seal portion.

According to this configuration, since the tip tubular portion that is exposed to the pressured medium and the inner tubular portion of the diaphragm have substantially the same length in the axial direction, for example, when the materials of both have the same or similar thermal deformability, a thermal deformation amount of the tip tubular portion toward the combustion chamber in the axial direction is substantially equal to an opposite thermal deformation amount of the inner tubular portion toward the output measurement unit in the axial direction. As a result, thermal deformation of both can be more accurately offset.

In the above-mentioned configuration, the output measurement unit may have a first electrode, a piezoelectric member and a second electrode that are sequentially layered in the axial direction, the housing may include a tubular insulating member fitted to provide electrical insulation between the first electrode and the second electrode, and the diaphragm may be disposed in a non-contact manner with the tubular insulating member.

According to this configuration, since the tubular insulating member provides electrical insulation between the first electrode and the second electrode, a function as the output measurement unit can be reliably guaranteed. In addition, as the inner tubular portion and the pressure receiving bottom portion of the diaphragm are disposed not to come in contact with the tubular insulating member, the diaphragm can accurately transmit a pressure of a pressured medium to the output measurement unit.

Advantageous Effects of Invention

According to the pressure sensor having the above-mentioned configuration, variation in sensor sensitivity with respect to temperature variation can be suppressed by suppressing a measurement error due to thermal deformation or the like while accomplishing simplification of a structure, reduction in the number of parts, reduction in the number of processing operations, reduction in cost, and so on. Therefore, it is possible to obtain a pressure sensor capable of accurately detecting a pressure of a pressured medium such as a combustion gas or the like in a combustion chamber of an engine.

DESCRIPTION OF EMBODIMENTS

Hereinafter, an embodiment of the present invention will be described with reference to the accompanying drawings.

A pressure sensor according to the embodiment is attached to a cylinder head H of an engine to detect a pressure of a combustion gas (a pressured medium) in a combustion chamber of the engine.

Figure 1:
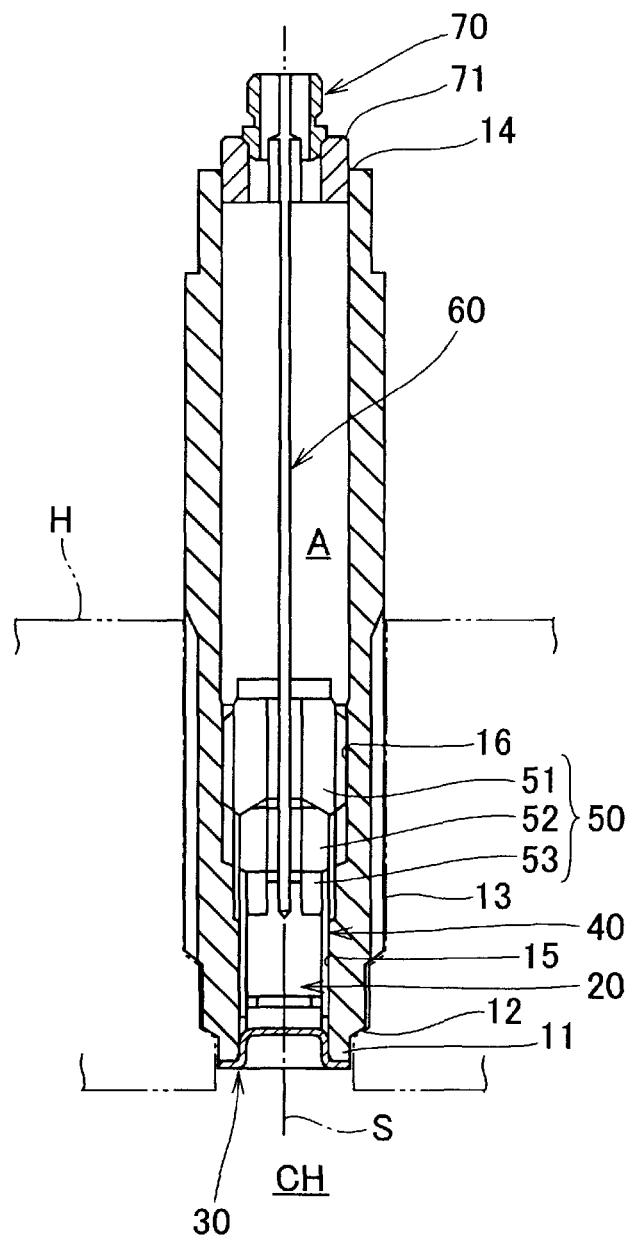
FIG. 1 is a cross-sectional view showing an embodiment of a pressure sensor according to the present invention.
Figure 2:
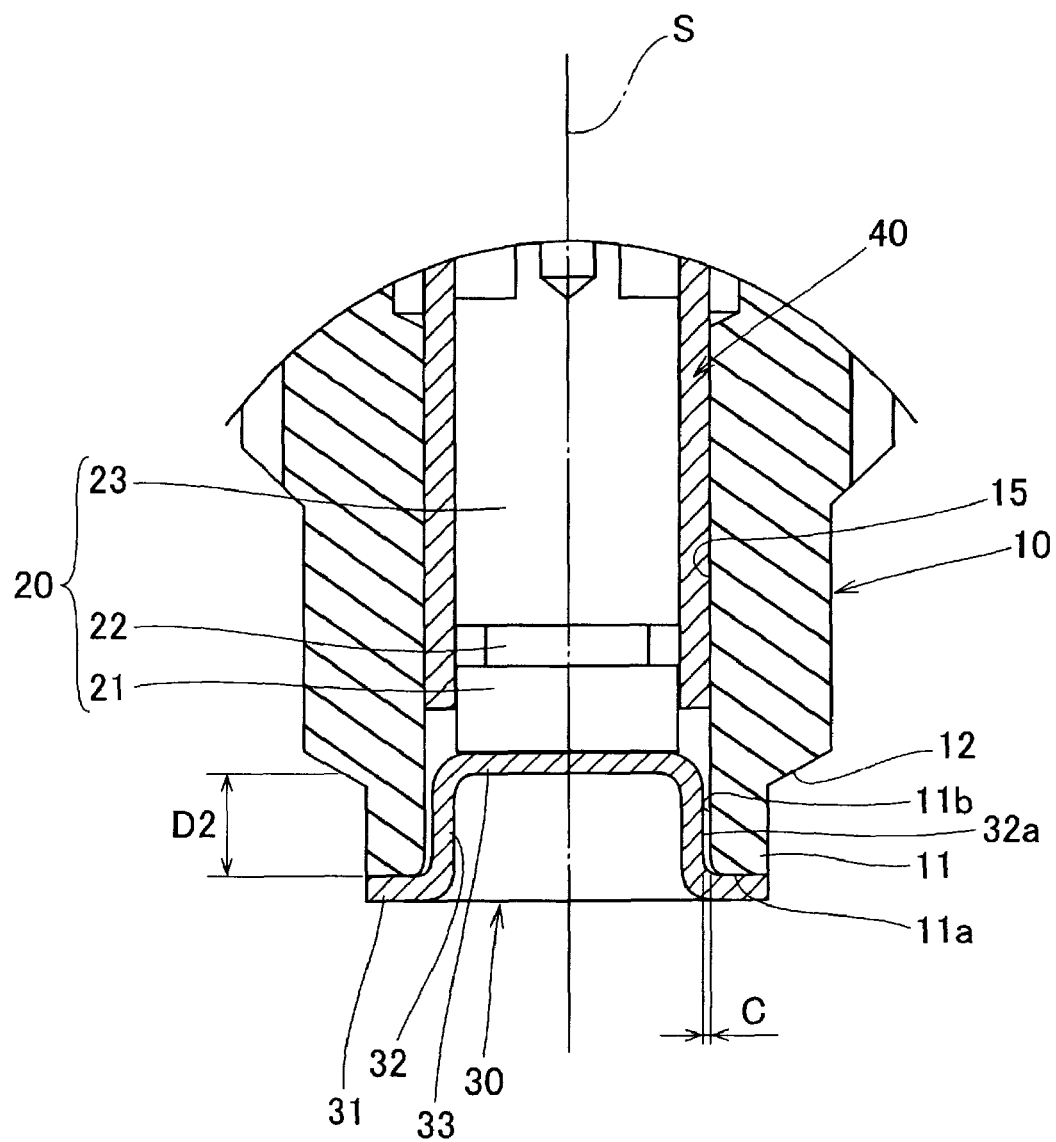
FIG. 2 is a partially enlarged cross-sectional view showing a tip tubular portion of a housing, a pressure transmission member (a diaphragm), an output measurement unit including a piezoelectric member, and so on, in the pressure sensor shown in FIG. 1.

As shown in FIGS. 1 and 2, the pressure sensor includes a housing 10 extending in an axis S direction, an output measurement unit 20 accommodated in the housing 10, a diaphragm 30 serving as a pressure transmission member configured to close an accommodating space of the output measurement unit 20 and transmit a pressure of a combustion gas applied in the axis S direction to the output measurement unit 20, a tubular insulating member 40 configured to provide electrical insulation between a first electrode 21 and a second electrode 23 of the output measurement unit 20, a pressing member 50 disposed in the housing 10 and configured to press and hold the output measurement unit 20 at a predetermined position, a lead wire 60 electrically connected to the output measurement unit 20, a connector (a receptacle) 70 connected to the other end portion of the housing 10, and so on.

The housing 10 is formed in a tubular shape extending in the axis S direction and defining an internal space A as shown in FIGS. 1 and 2 using a metal material such as a stainless steel material or the like having, for example, a precipitation hardening property.

The housing 10 includes a tip tubular portion 11 extending in the axis S direction, a seal portion 12 having an enlarged diameter around the tip tubular portion 11 and formed in a conical surface shape, a male screw portion 13 screwed and fixed into a female screw portion in an attachment hole of the cylinder head H, an opening end portion 14 configured for attaching a connector 70 via a spacer 71, a tubular inner wall surface 15 for fitting the tubular insulating member 40, a female screw portion 16 configured to screw and fix the pressing member 50, and so on.

Here, the internal space A defines an accommodating space that accommodates the output measurement unit 20 in a portion thereof.

As shown in FIG. 2, the tip tubular portion 11 is exposed to a high temperature combustion gas in a combustion chamber CH in a region disposed at a tip side in the axis S direction from the seal portion 12 and formed in a tubular shape having a uniform thickness.

The tip tubular portion 11 includes an end surface 11a serving as a tip portion configured to fix the diaphragm 30, and an inner wall surface 11b having the same diameter as that of the inner wall surface 15. In addition, an inner edge portion of the end surface 11a of the tip tubular portion 11 is formed in a curved shape by forming an angle R, a chamfer, or the like, which does not come in contact with a folding region of the diaphragm 30, i.e., a folding region continuing to an inner tubular portion 32 from an annular flange portion 31.

As shown in FIG. 2, the seal portion 12 is formed in a conical surface shape while being enlarged in diameter at a predetermined position retracted from the end surface 11a of the tip tubular portion 11 in the axis S direction. Thus, the seal portion 12 is joined to a seal surface of the cylinder head H and functions to prevent leakage of a combustion gas in the combustion chamber CH. That is, the tip tubular portion 11 exposed to the combustion gas and other regions not exposed to the combustion gas are divided by this region as a boundary.

As shown in FIG. 2, the output measurement unit 20 includes the first electrode 21, a piezoelectric member 22 and the second electrode 23, which are sequentially layered in the axis S direction to be formed in substantially a disk shape or a columnar shape.

The piezoelectric member 22 is interposed between the first electrode 21 and the second electrode 23 and outputs an electrical signal on the basis of strain due to a pressure received in the axis S direction. A piezo element, zinc oxide, a crystal, or the like, is applied as the piezoelectric member 22.

The first electrode 21 is formed of a conductive metal material in a disk shape or a columnar shape. Then, as shown in FIG. 2, the first electrode 21 is disposed close to a pressure receiving bottom portion 33 of the diaphragm 30 while being in close contact with the piezoelectric member 22, and electrically connected to the ground (a negative side) via the diaphragm 30→the housing 10→the cylinder head H.

The second electrode 23 is formed of a conductive metal material in a disk shape or a columnar shape. Then, as shown in FIG. 2, the second electrode 23 is disposed close to the piezoelectric member 22 and electrically connected to the electrically positive side via the lead wire 60.

For example, the diaphragm 30 is formed to have a bottom (a concave shape) using a metal material such as a stainless steel material or the like having a precipitation hardening property.

Figure 3A:
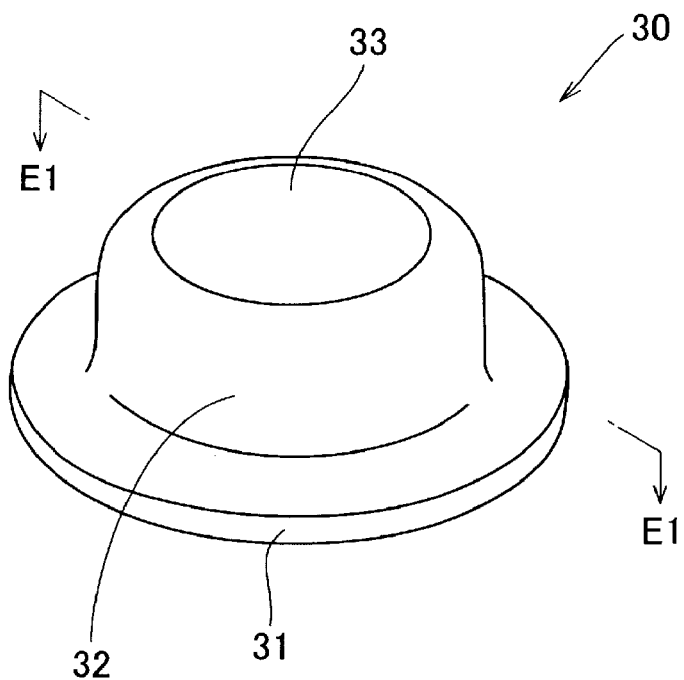
FIG. 3A is an external perspective view showing a diaphragm included in the pressure sensor shown in FIG. 1.
Figure 3B:
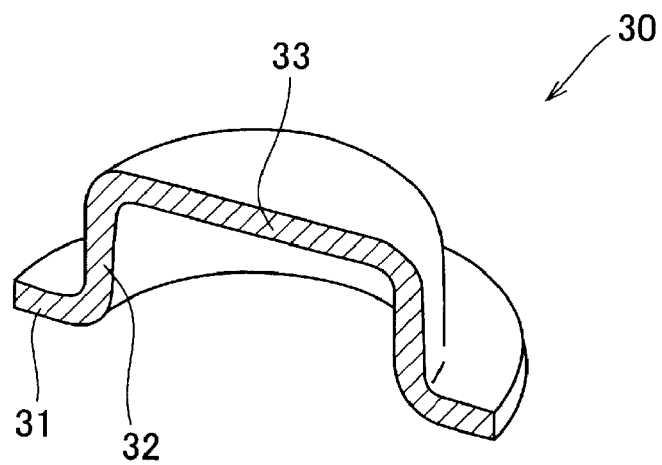
FIG. 3B is a cross-sectional perspective view of the diaphragm taken along line E1-E1 in FIG. 3A.
Figure 4:
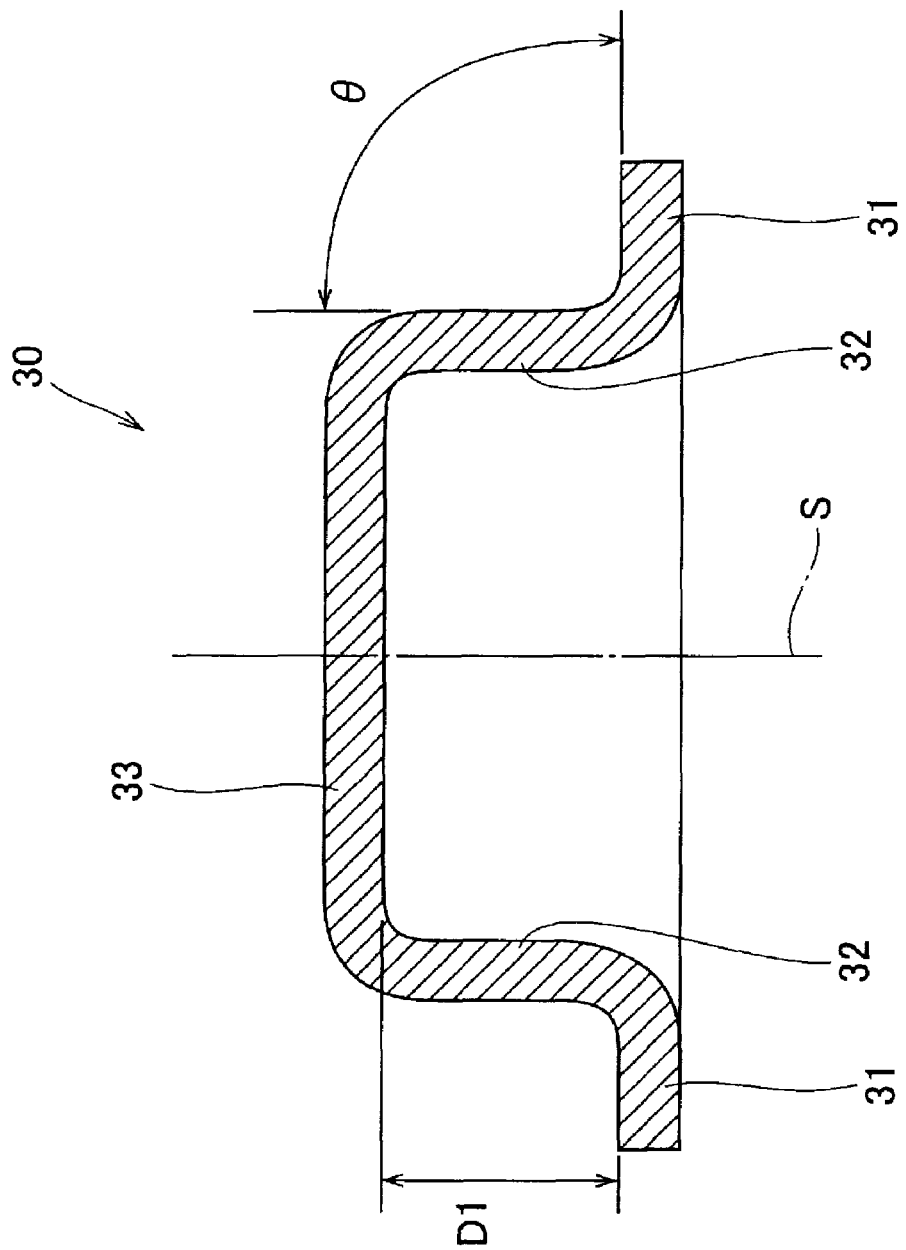
FIG. 4 is a cross-sectional view showing a depth dimension of the diaphragm and a folding angle of an annular flange portion included in the pressure sensor shown in FIG. 1.

As shown in FIGS. 2 to 4, the diaphragm 30 includes the annular flange portion 31 fixed to the end surface 11a of the tip tubular portion 11, the inner tubular portion 32 formed integrally with the annular flange portion 31 and extending in the axis S direction toward the output measurement unit 20 inside the tip tubular portion 11, the pressure receiving bottom portion 33 formed integrally with the inner tubular portion 32 and abutting the first electrode 21 of the output measurement unit 20, and so on.

As shown in FIG. 2, the annular flange portion 31 is formed in a disk shape. Then, the annular flange portion 31 is bonded to the end surface 11a of the tip tubular portion 11 of the housing 10 and fixed thereto by welding (for example, laser welding) or the like and mainly performs a fixing function.

The inner tubular portion 32 is formed in a tubular shape extending from the end surface 11a side toward the output measurement unit 20 side with an axis S of the tip tubular portion 11 as a central axis inside the tip tubular portion 11 of the housing 10, as shown in FIG. 2, and mainly performs a deformation function in the axis S direction. Here, a predetermined gap C is formed between an outer wall surface 32a of the inner tubular portion 32 and the inner wall surface 11b of the tip tubular portion 11.

Here, the predetermined gap C has a dimension such that these do not mutually drag each other and do not exert an influence on each other even when both of these thermally deform (thermally expand). Accordingly, even when these are in a contact state during thermal expansion, one may not drag the other and may not exert an influence on the other.

The pressure receiving bottom portion 33 is disposed close to the output measurement unit 20 as shown in FIG. 2 to perform a function of receiving a pressure of a combustion gas in the axis S direction and is formed to directly transmit the received pressure to the output measurement unit 20.

Here, as shown in FIG. 4, the annular flange portion 31 and the inner tubular portion 32 are formed integrally with each other, and the annular flange portion 31 is formed to be folded within a range of a folding angle θ of 90 to 100 degrees with respect to the inner tubular portion 32.

According to this, the annular flange portion 31 may act with a fixing function, and the inner tubular portion 32 may act with a deformation function of expanding toward the output measurement unit 20 in the axis S direction. In addition, as the folding angle θ of both is set to a range of 90 to 100 degrees, the inner tubular portion 32 of the diaphragm 30 may match a direction of thermal expansion toward the output measurement unit 20 with respect to a direction in which the housing 10 thermally expands. Therefore, a state of maintaining a contact position between the pressure receiving bottom portion 33 of the diaphragm 30 and the output measurement unit 20 can be more accurately managed.

That is, when the folding angle θ is smaller than 90 degrees, the inner tubular portion 32 may interfere with the tip tubular portion 11 of the housing 10. Accordingly, a gap can be secured by setting the angle to 90 degrees with no interference.

In addition, when the folding angle θ is larger than 100 degrees, if the tip tubular portion 11 of the housing 10 is long in the axis S direction, a contact state between the pressure receiving bottom portion 33 and the first electrode 21 of the output measurement unit 20 may become unstable and the accuracy of pressure transmission be decreased, and the pressure receiving bottom portion 33 of the diaphragm 30 may not be formed accurately. Accordingly, when the folding angle is set to 100 degrees or less, the pressure receiving bottom portion 33 can be accurately formed and accuracy of the pressure transmission can be improved.

In addition, as shown in FIG. 2, in a state in which the inner tubular portion 32 of the diaphragm 30 is inserted inside the tip tubular portion 11 of the housing 10, the predetermined gap C is formed between the inner wall surface 11b of the tip tubular portion 11 and the outer wall surface 32a of the inner tubular portion 32.

Accordingly, when the tip tubular portion 11 of the housing 10 expands toward the combustion chamber CH in the axis S direction, the inner tubular portion 32 of the diaphragm 30 can be prevented from being dragged by movement of the tip tubular portion 11 and moved in the same direction.

Therefore, expansion and movement of the tip tubular portion 11 toward the combustion chamber CH can be more reliably offset by expansion movement of the inner tubular portion 32 toward the output measurement unit 20 such that a contact position between the pressure receiving bottom portion 33 of the diaphragm 30 and the output measurement unit 20 can be maintained.

In addition, as shown in FIGS. 2 and 4, a length D1 of the inner tubular portion 32 of the diaphragm 30 in the axis S direction is formed to be substantially equal to a length D2 in the axis S direction from the end surface 11a of the tip tubular portion 11 to the seal portion 12.

According to this, since the tip tubular portion 11 exposed to the combustion gas and the inner tubular portion 32 of the diaphragm 30 have the same length in the axis S direction, for example, when materials of both are materials having the same or similar thermal deformation, a thermal deformability amount of the tip tubular portion 11 toward the combustion chamber CH in the axis S direction and an opposite thermal deformation amount of the inner tubular portion 32 toward the output measurement unit 20 in the axis S direction are substantially the same as each other. As a result, thermal deformation of both can be more accurately offset.

Basically, in consideration of thermal expansion coefficients (a linear expansion coefficient and a volume expansion coefficient) of materials that form the housing 10 and the diaphragm 30, shapes thereof, and so on, the tip tubular portion 11 of the housing 10 and the inner tubular portion 32 of the diaphragm 30 have substantially the same thermal deformation amount in the axis S direction. Accordingly, a thermal deformation amount of the tip tubular portion 11 toward the combustion chamber CH in the axis S direction and an opposite thermal deformation amount of the inner tubular portion 32 toward the output measurement unit 20 in the axis S direction may be substantially the same as each other. As a result, the thermal expansion of the tip tubular portion 11 of the housing 10 can be accurately offset by the opposite thermal expansion of the inner tubular portion 32 of the diaphragm 30.

In this way, as the inner tubular portion 32 is provided in the diaphragm 30, when the tip tubular portion 11 of the housing 10 expands toward the combustion chamber CH in the axis S direction, the inner tubular portion 32 of the diaphragm 30 expands toward the output measurement unit 20 in the axis S direction.

Figure 5:
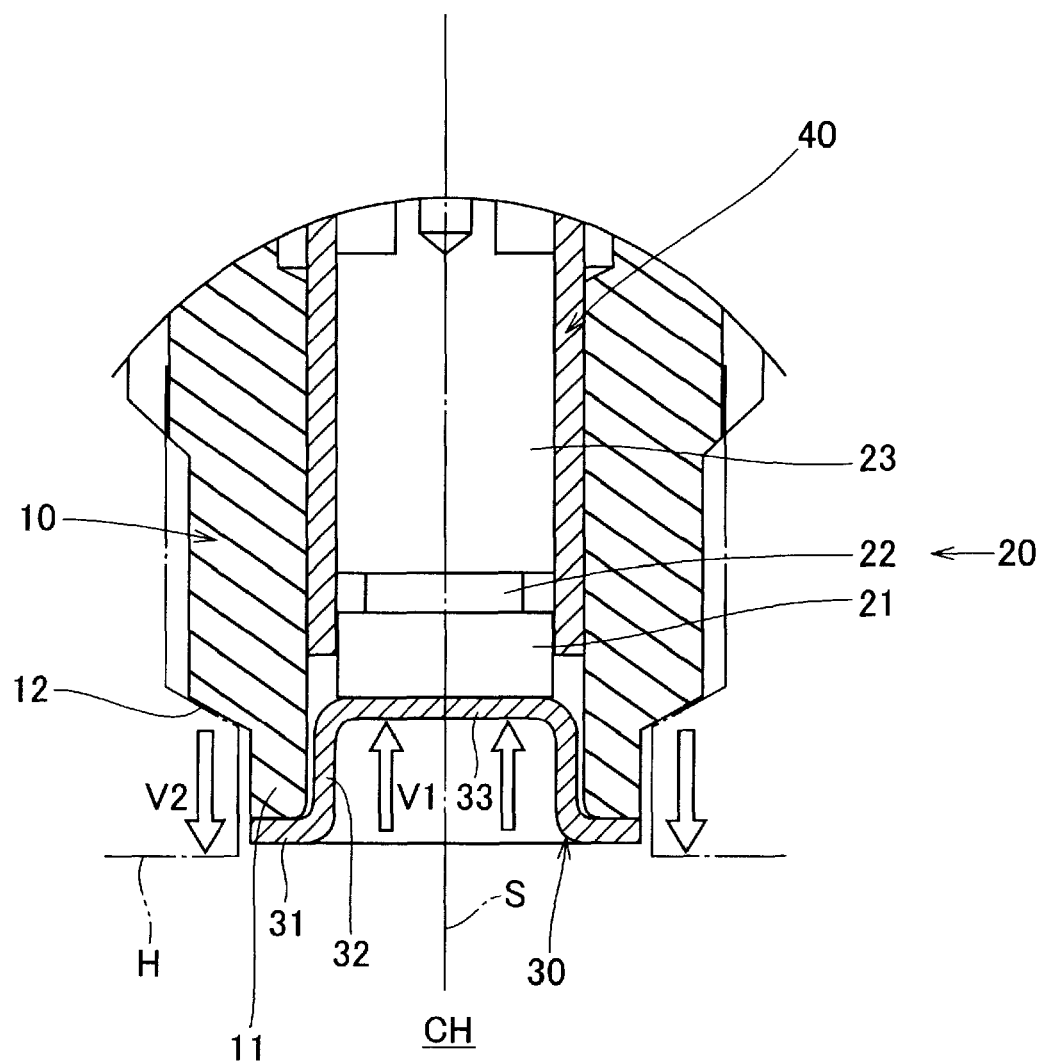
FIG. 5 is a partially enlarged cross-sectional view for describing an action relation according to thermal expansion between the tip tubular portion and an inner tubular portion of the diaphragm in the pressure sensor according to the present invention.

That is, as shown in FIG. 5, since the inner tubular portion 32 of the diaphragm 30 and the tip tubular portion 11 of the housing 10 thermally expand in opposite directions such that a thermal expansion V1 of the inner tubular portion 32 of the diaphragm 30 in the axis S direction offsets a thermal expansion V2 of the tip tubular portion 11 of the housing 10 in the axis S direction, a contact position between the pressure receiving bottom portion 33 of the diaphragm 30 and the first electrode 21 of the output measurement unit 20 can be maintained. Therefore, variation in preload applied to the output measurement unit 20 can be prevented, and output noise from the piezoelectric member due to the variation in preload can be prevented. As a result, a measurement error due to thermal deformation or the like can be suppressed, and a pressure of a combustion gas in the combustion chamber of the engine can be detected with high accuracy.

In addition, since the pressure transmission member is constituted by only the diaphragm 30 fixed to the end surface 11a of the tip tubular portion 11 of the housing 10, there are less causes of an error due to thermal deformation. In addition, it is possible to accomplish simplification of a structure, reduction in the number of parts, reduction in the manufacturing time, reduction in cost, and so on.

The tubular insulating member 40 is formed of a resin material or the like having a thermal resistance in a tubular shape. Then, as shown in FIGS. 1 and 2, the tubular insulating member 40 is fitted into the inner wall surface 15 of the housing 10 while positioning the output measurement unit 20 (the first electrode 21, the piezoelectric member 22 and the second electrode 23) in the inside thereof.

Here, the tubular insulating member 40 is provided to electrically insulate the first electrode 21 from the second electrode 23, wherein the first electrode 21 is electrically connected to the housing 10 via the diaphragm 30.

That is, the tubular insulating member 40 has a function of centering the output measurement unit 20 on the axis S in a radial direction perpendicular to the axis S, in addition to a function of insulating the first electrode 21 and the second electrode 23. In addition, as shown in FIG. 2, the tubular insulating member 40 is disposed such that a non-contact state with respect to the diaphragm 30 is formed.

Accordingly, the diaphragm 30 can accurately transmit a pressure of a combustion gas (a pressured medium) to the output measurement unit 20 without receiving an influence of the tubular insulating member 40.

As shown in FIG. 1, the pressing member 50 is constituted by a screw portion 51 screwed into the female screw portion 16 of the housing 10, an axial adjustment portion 52 abutting and pushed into the screw portion 51, and an insulating portion 53 pushed by the axial adjustment portion 52 and configured to push the second electrode 23.

For example, the screw portion 51 and the axial adjustment portion 52 are formed of the same metal material as the housing 10.

The insulating portion 53 is formed of an insulating material having high electrical insulation such as alumina or the like.

Then, as shown in FIG. 1, in a state in which the output measurement unit 20 is disposed at a predetermined position, the insulating portion 53 is fitted into the output measurement unit 20. Next, the axial adjustment portion 52 is disposed on the insulating portion 53. Next, the screw portion 51 is disposed on the axial adjustment portion 52 to be screwed into the female screw portion 16. Accordingly, the output measurement unit 20 is positioned and held at a predetermined position in the axis S direction. Further, the insulating portion 53 and the tubular insulating member 40 are configured to be integrated by press-fitting or the like.

As shown in FIG. 1, the lead wire 60 is electrically connected to the second electrode 23 of the output measurement unit 20, and guided to the connector 70 through the internal space A of the housing 10 by passing through through-holes of the axial adjustment portion 52 and the screw portion 51.

The connector 70 is provided as a receptacle and coupled to the opening end portion 14 of the housing 10 via the spacer 71. Thus, the connector 70 is provided to be detachably connected to an external connector (plug).

Figure 6:
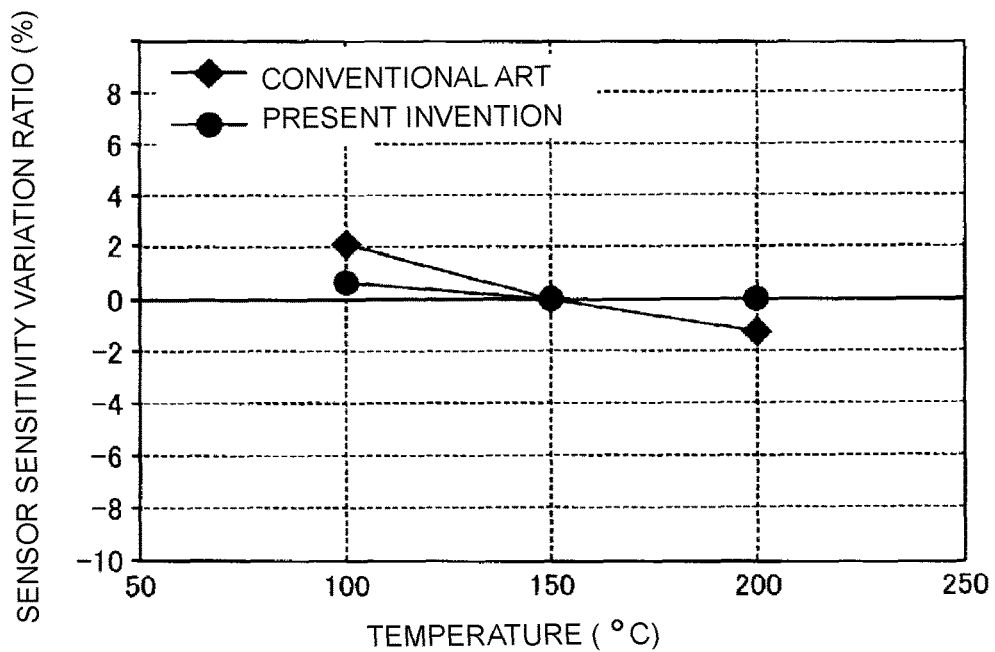
FIG. 6 is a graph showing a proportional change in sensor sensitivity with respect to temperature variation in pressure sensor according to the present invention and the pressure sensor in the related art.

FIG. 6 is a graph showing results obtained in a comparative experiment regarding a proportional change in sensor sensitivity with respect to temperature variation between the pressure sensor according to the present invention and the pressure sensor of the related art including the diaphragm having a recess slightly recessed at a center as disclosed in Patent Literature 1.

As will be apparent from the results of FIG. 6, in the pressure sensor of the related art, the sensor sensitivity within a temperature range of 100° C. to 200° C. varied within a range of +2% to −2%, whereas, in the pressure sensor of the present invention, the sensor sensitivity is hardly changed within a temperature range of 100° C. to 200° C.

In this way, according to the pressure sensor of the present invention, since the variation in sensor sensitivity due to temperature variation is suppressed, a pressure of a pressured medium such as a combustion gas or the like in the combustion chamber of the engine can be detected with high accuracy.

Figure 7:
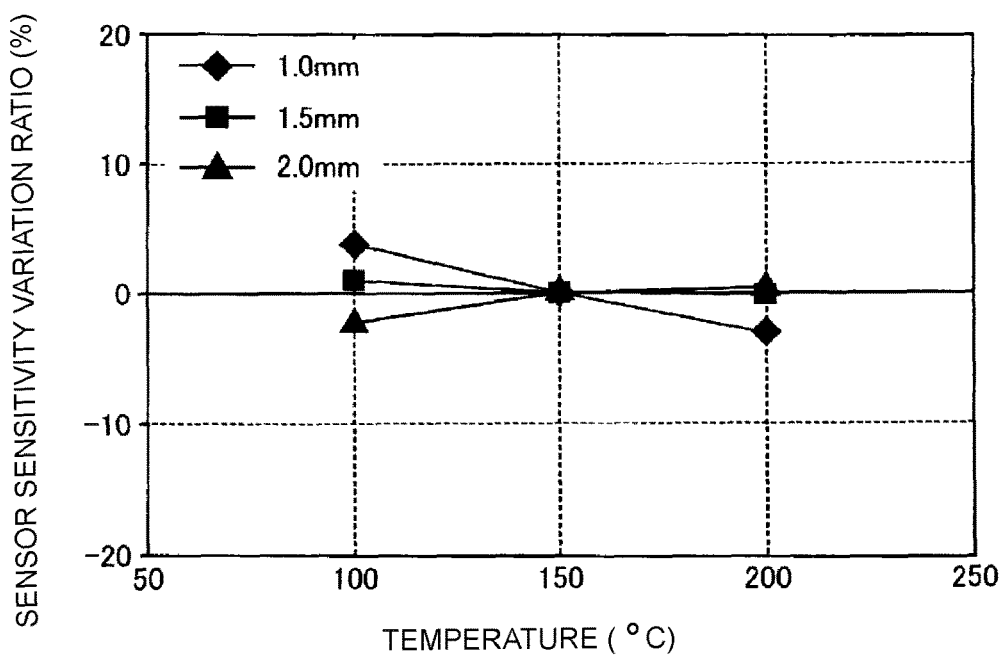
FIG. 7 is a graph showing a proportional change in sensor sensitivity with respect to temperature variation when a depth dimension of the diaphragm (a dimension in an axial direction from an outer end surface of the annular flange portion to a pressure receiving bottom portion) in the pressure sensor according to the present invention is changed.

FIG. 7 is a graph showing results in which a proportional change in the sensor sensitivity with respect to temperature variation was checked when a recess depth of the diaphragm 30 (a length in the axis S direction from an outer end surface of the annular flange portion 31 to a bottom surface of the pressure receiving bottom portion 33) was varied in the pressure sensor according to the present invention. In addition, the case in which the recess depth used in the experiment was 1.5 mm is a state in which the length D1 was substantially equal to the length D2.

In this way, it is possible to obtain a pressure sensor having a sensor sensitivity independent from temperature variation by appropriately adjusting a depth dimension of the diaphragm 30, i.e., the length D1 of the inner tubular portion 32 with respect to the length D2 of the tip tubular portion 11 in consideration of a material of the diaphragm 30 and a material of the housing 10.

As described above, according to the pressure sensor of the embodiment, as the inner tubular portion 32 is provided in the diaphragm 30, the thermal expansion of the tip tubular portion 11 of the housing 10 can be offset by the opposite thermal expansion of the inner tubular portion 32 of the diaphragm 30.

Therefore, a contact state between the pressure receiving bottom portion 33 of the diaphragm 30 and the first electrode 21 of the output measurement unit 20 can be maintained at a predetermined position, and variation of a preload applied to the output measurement unit 20 can be prevented.

As a result, variation in sensor sensitivity with respect to temperature variation can be suppressed by suppressing a measurement error due to thermal deformation or the like, and a pressure such as that of a high temperature combustion gas or the like in the combustion chamber CH of the engine can be detected with high accuracy.

In the embodiment, while the diaphragm 30 in which the annular flange portion 31 has an annular shape, the inner tubular portion 32 has a cylindrical shape and the pressure receiving bottom portion 33 has a disk shape has been described as the diaphragm that is the pressure transmission member, it is not limited thereto.

As long as the configuration in which the diaphragm is fixed to the tip portion of the tip tubular portion 11, a configuration other than the annular flange portion may be employed, or, when the tip tubular portion 11 of the housing 10 has a shape other than a cylindrical shape, a configuration appropriate for it may be employed.

As described above, the pressure sensor of the present invention can suppress a measurement error due to thermal deformation or the like and detect a pressure of a pressured medium with high accuracy while accomplishing simplification of a structure, reduction in the number of parts, reduction in the number of process, reduction in cost, and so on. Accordingly, in particular, it can be applied not only as a pressure sensor configured to detect a pressure of a combustion gas or the like in a combustion chamber of an engine but also as a pressure sensor configured to detect a pressure of a high temperature pressured medium other than a combustion gas or another pressured medium.

The invention claimed is:

1. A pressure sensor comprising:
a housing extending in a predetermined axial direction and including a tip tubular portion exposed to a pressured medium;
an output measurement unit including a piezoelectric member accommodated in the housing; and
a pressure transmission member configured to close an accommodating space of the output measurement unit in the housing and transmit a pressure of the pressured medium applied in the axial direction to the output measurement unit,
wherein the pressure transmission member is a bottomed diaphragm, and the pressure transmission member includes an inner tubular portion fixed to a tip portion of the tip tubular portion and extending in the axial direction toward the output measurement unit inside the tip tubular portion, and a pressure receiving bottom portion formed integrally with the inner tubular portion and abutting the output measurement unit,
wherein the housing includes a seal portion configured to seal the pressured medium around the tip tubular portion and at a predetermined position retracted from an end surface of the tip tubular portion, and
the length of the inner tubular portion of the diaphragm in the axial direction is the same as the distance in the axial direction from the end surface of the tip tubular portion to the seal portion.

2. The pressure sensor according to claim 1, wherein the pressure transmission member includes an annular flange portion fixed to an end surface of the tip tubular portion, and
the inner tubular portion is formed integrally with the annular flange portion.

3. The pressure sensor according to claim 2, wherein the annular flange portion is folded to a folding angle within a range of 90 to 100 degrees with respect to the inner tubular portion.

4. The pressure sensor according to claim 1, wherein the inner tubular portion is disposed inside the tip tubular portion with a predetermined gap.

5. The pressure sensor according to claim 1, wherein the tip tubular portion and the inner tubular portion are formed to have the same thermal deformation amount in the axial direction.

6. The pressure sensor according to claim 1, wherein the output measurement unit includes a first electrode, the piezoelectric member and a second electrode that are sequentially layered in the axial direction,
the housing includes a tubular insulating member fitted to provide electrical insulation between the first electrode and the second electrode, and
the diaphragm is disposed in a non-contact manner with the tubular insulating member.

* * * * *